US007281127B2

United States Patent
Rothman et al.

(10) Patent No.: US 7,281,127 B2
(45) Date of Patent: Oct. 9, 2007

(54) CONCURRENT PROCESSING OF OPERATIONS IN A BOOT SEQUENCE TO INITIALIZE A STORAGE DEVICE INCLUDING AN OPERATING SYSTEM LOADER TO LOAD

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 11/024,262

(22) Filed: Dec. 27, 2004

(65) Prior Publication Data

US 2006/0149959 A1   Jul. 6, 2006

(51) Int. Cl.
*G06F 9/445* (2006.01)
*G06F 15/177* (2006.01)

(52) U.S. Cl. .............................................. 713/2; 713/1
(58) Field of Classification Search ............... 713/1, 713/2
See application file for complete search history.

(56) References Cited

U.S. PATENT DOCUMENTS

| | | | | |
|---|---|---|---|---|
| 5,420,998 A * | 5/1995 | Horning | ............... | 711/113 |
| 6,336,185 B1 * | 1/2002 | Sargenti et al. | ............ | 713/2 |
| 6,349,347 B1 * | 2/2002 | Porterfield | .......... | 710/10 |
| 6,539,456 B2 * | 3/2003 | Stewart | .................. | 711/113 |
| 6,662,267 B2 * | 12/2003 | Stewart | .................. | 711/113 |
| 6,886,109 B2 * | 4/2005 | Olarig et al. | .............. | 714/25 |
| 7,073,054 B2 * | 7/2006 | Kim et al. | .................. | 713/2 |
| 7,100,040 B2 * | 8/2006 | Fortin et al. | .............. | 713/2 |
| 2005/0289332 A1 * | 12/2005 | Rothman et al. | ........... | 713/1 |

OTHER PUBLICATIONS

Kozierok, C.M., "*Continuous Power vs Peak Power at Spin-Up*", Site Version: 2.2.0, [online], Apr. 17, 2001, [retrieved on Dec. 17, 2004], retrieved from the Internet at <URL: http://www.pcguide.com/ref/hdd/op/spinPower-c.html>.

Microsoft Corp., "Simple Boot Flag Specification Overview", [online], Feb. 7, 2002, [retrieved on Dec. 17, 2004], retrieved from the Internet at <URL: http://www.microsoft.com/whdc/resources/respec/specs/simp_bios.mspx?pd=true>.

* cited by examiner

*Primary Examiner*—Chun Cao
(74) *Attorney, Agent, or Firm*—Konrad Raynes & Victor LLP; David W. Victor

(57) ABSTRACT

Provided are a method, system, and program for concurrent processing of operations in a boot sequence. A first processor signals a second processor to begin initialization and initializes computer resources. The second processor issues commands to initialize at least one storage device to place the at least one storage device in an operable state in response to the signaling by the first processor. The first process determines that one storage device including an operating system loader is operable and loads the operating system from the storage device including the operating system loader in response to determining that the storage device including the operating system loader is operable.

32 Claims, 3 Drawing Sheets

CONCURRENT PROCESSING OF OPERATIONS IN A BOOT SEQUENCE TO INITIALIZE A STORAGE DEVICE INCLUDING AN OPERATING SYSTEM LOADER TO LOAD

BACKGROUND

A computer system includes a basic input/output system (BIOS) memory that stores the code for the boot sequence the central processing unit (CPU) executes to power-on and initialize the computer components. Typically, the CPU executing the BIOS code initializes certain hardware components, such as the memory, and then spins-up the hard disk drives. After the hard disk drives are operable, the CPU will then load the operating system from one hard disk drive to boot the system. The time taken to boot the system increases as the number of hard disk drives the CPU must spin-up increases.

Mission critical systems have certain requirements, such as maintaining 99.999% availability, also known as the "five nines". For instance, to comply with the "five nines" requirement over the course of a year, boot time could not take more than 5.25 minutes, i.e., 365 days*24 hours*60 minutes*0.00001 (the downtime allowed per year for a re-boot). If a platform takes too long to boot, then the platform may not be able to maintain the "five nines" operating designation during the performance measurement period.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
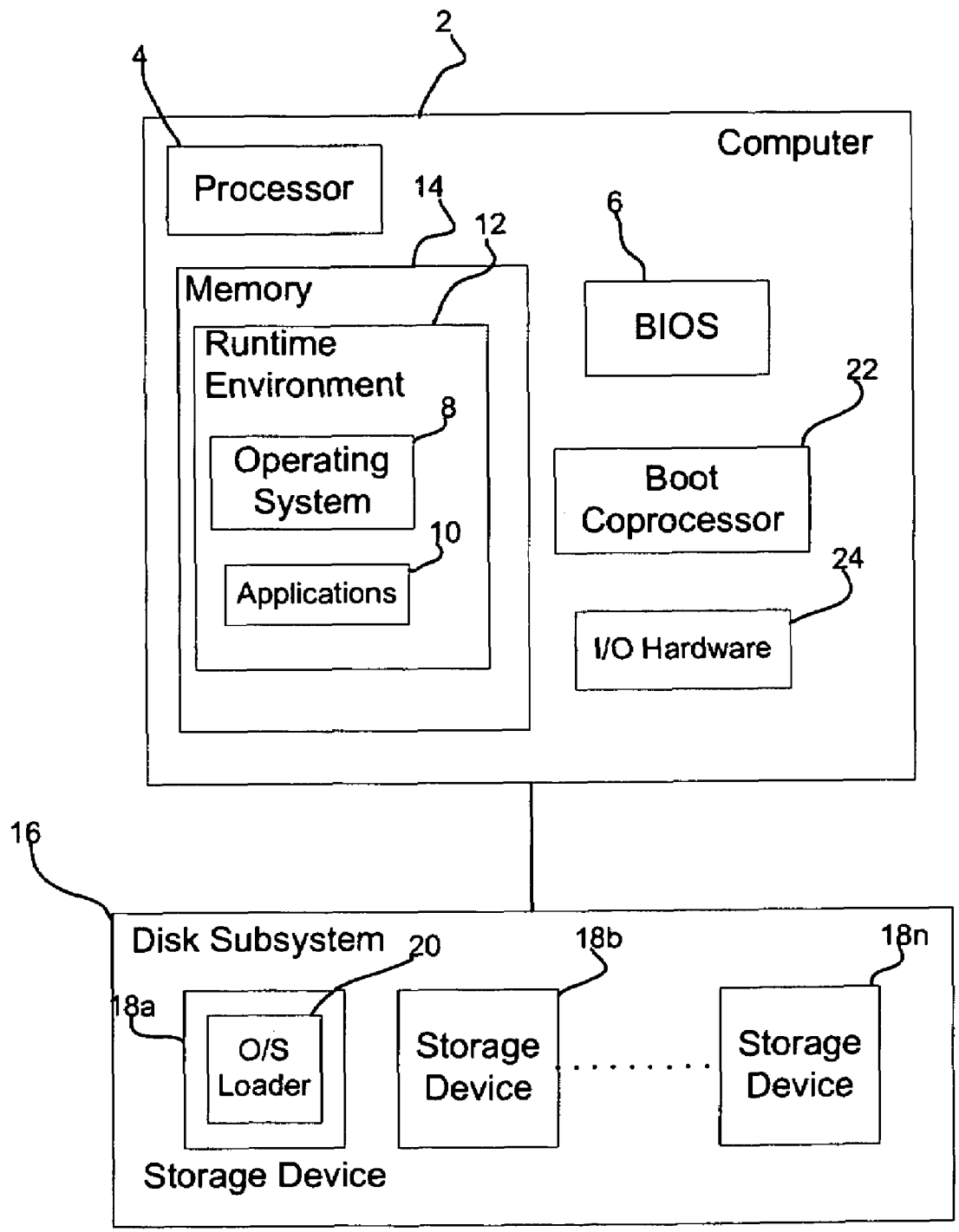
FIG. 1 illustrates an embodiment of a network computing environment.

FIG. 1 illustrates a computing environment used with the described embodiments. A computer 2 includes a processor 4 (such as one or more central processing units (CPU)), a basic input/output system (BIOS) 6 including code executed by the processor 4 to initialize and control various computer 2 components (e.g., the keyboard, display screen, disk drives, serial communications, etc.). As part of the boot sequence, the processor 4 loads an operating system 8, application programs 10, and device drivers (not shown), e.g., network adaptor, disk drivers, display drivers, etc., into a runtime environment 12 implemented in memory 14. The computer 2 is coupled to a storage subsystem 16 comprising a plurality of storage devices 18a, 18b . . . 18n. In an alternative embodiment, the computer 2 may only be coupled to a single local storage device or disk drive. One storage device, e.g., 18a, includes an operating system loader 20 that the processor 4 uses to load the operating system 8. A boot coprocessor 22 is used to perform certain of the boot sequence initialization operations, such as handling the power-up of the storage devices 18a, 18b . . . 18n to place the storage devices 18a, 18b . . . 18n in an operable condition. In an embedment where the storage devices 18a, 18b . . . 18n comprise hard disk drives, the boot coprocessor 22 performs a spin-up of the disk drives. In alternative embodiments where the storage devices 18a, 18b . . . 18n comprise other suitable non-volatile storage medium, such as electronic storage, the boot coprocessor 22 may perform different device specific initialization or power-on operations to place the storage devices 18a, 18b . . . 18n in an operable state.

The BIOS 6 may be implemented in firmware in a non-volatile memory device on the user system 2 motherboard, such as a Flash memory, Read Only Memory (ROM), Programmable ROM (PROM), etc. The BIOS 6 code indicates the sequence of the boot operations and indicates the boot storage device 18a including the operating system loader 20. The boot coprocessor 22, which may comprise a microcontroller, performs certain of the boot sequence operations, such as disk drive spin-up, concurrently with the initialization operations performed by the processor 4 executing the BIOS 6 code.

The computer 2 may additionally include certain I/O hardware 24, such as an I/O controller (e.g., I/O controller hub (ICH)) providing an interface to components on the computer 2, such as a bus. The boot coprocessor 22 may initialize such I/O hardware 24.

The operating system 8 may comprise an operating system known in the art, such as a Microsoft® Windows® operating system, Linux™, etc. (Microsoft and Windows are registered trademarks of Microsoft Corporation and Linux is a trademark of Linus Torvalds). The applications 10 may comprise programs loaded during the boot sequence or invoked by the user during runtime.

In one embodiment, the computer 2 and disk subsystem 16 may be implemented in a single housing, where the disk subsystem 16 may be coupled to a same motherboard or blade as the computer 2 or on a separate motherboard or blade.

Figure 2:
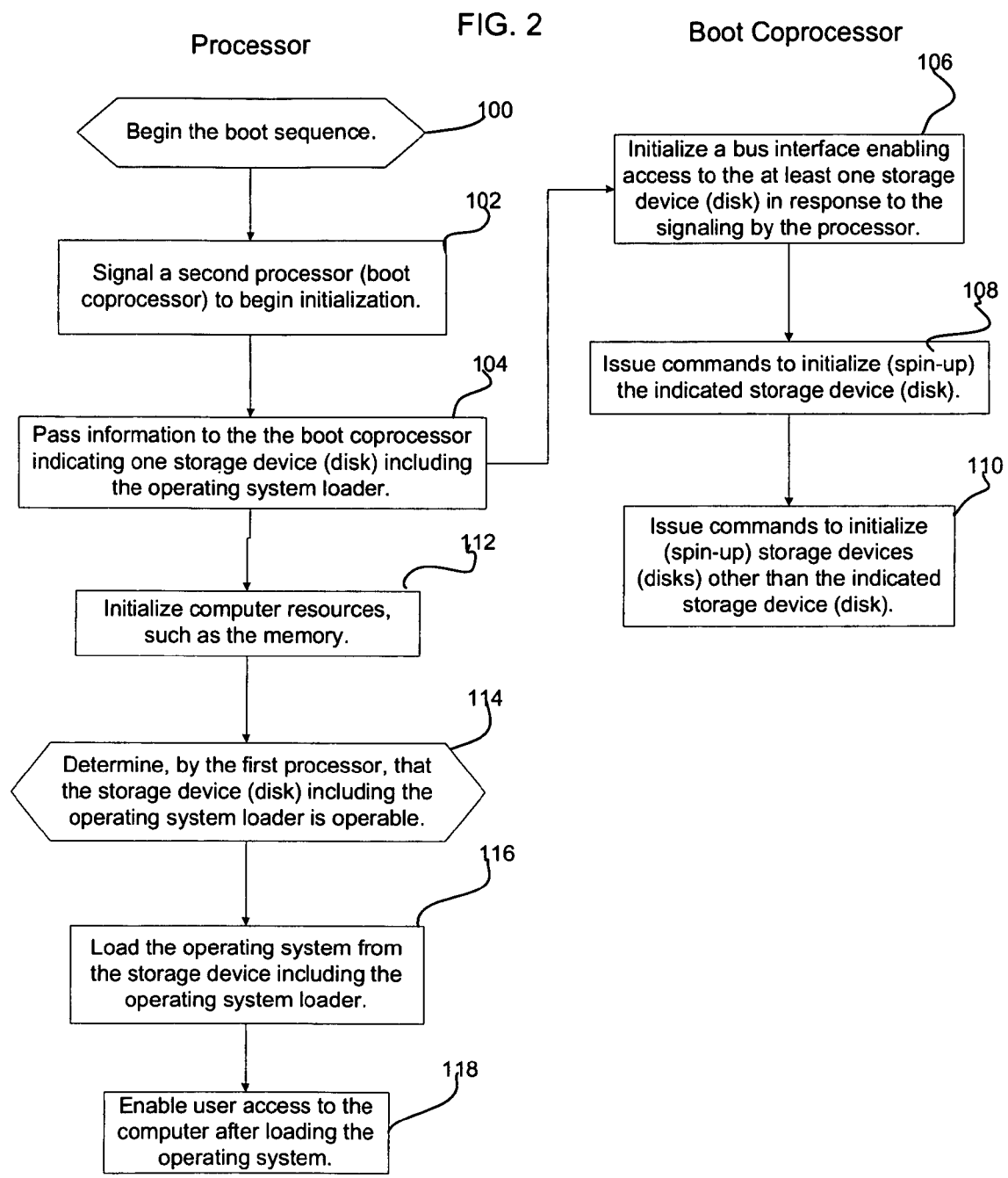
FIG. 2 illustrates an embodiment of operations to access and install patches.

FIG. 2 illustrates operations performed by the processor 4 executing the BIOS 6 code and the boot coprocessor 22 to perform the power-on and initialization sequence. Control begins at block 100 with the processor 4 executing the BIOS 6 code to begin the boot sequence for the computer 2 in response to an initialization event, such as a power cycle or a power-on self test (POST). The processor 4 signals (at block 102) a second processor, such as the boot coprocessor 22, to begin initialization and passes information indicating one storage device 18a (e.g., hard disk drive) including the operating system loader 20. The information on the storage device 18a having the operating system loader 20 may be included in the BIOS code 6. In response, the boot coprocessor 22 initializes (at block 106) hardware 24, such as an interface to the bus (e.g., ICH), enabling access to the at least one storage device (e.g., disk) 18a, 18b . . . 18n. The boot coprocessor 22 issues (at block 108) commands to initialize the indicated storage device 18a, such as by applying power to spin-up the disk including the operating system loader 20. After initializing the storage device 18a (disk) having the operating system loader 20, the boot coprocessor 22 issues commands (at block 110) to initialize (spin-up) storage devices (disks) other than the indicated storage device 18a.

While the coprocessor 22 is initializing the storage devices 18a, 18b . . . 18n to place them in an operable state, the processor 4 initializes (at block 112) computer 2 resources, such as the memory 14. The processor 4 determines (at block 114) whether the storage device 18a (disk) including the operating system loader 20 is operable. In one embodiment, the boot coprocessor 22 may signal the processor 4, such as by a system management interrupt (SMI), in response to determining that the storage device 18 including the operating system loader 20 is operable. This signal causes the processor 4 to determine that the storage device 18a is operable. In an alternative embodiment, the processor 4 may periodically check the status of a flag. The boot coprocessor 22 sets the flag in response to determining that the storage device 18 including the operating system loader 20 is operable. The processor 4 determines that the storage device 18a is operable upon determining that the flag is in the "set" state indicating operability. In response to determining that the storage device 18a including the operating system loader 20 is operable, the processor 4 loads (at block 116) the operating system 8 into the runtime environment 12 from the storage device 18a including the operating system loader 20. After loading the operating system 8 the user of the computer 2 is enabled (at block 118) to run the applications 10.

In one embodiment, upon initializing the storage device 18a (e.g.,disk) including the operating system loader 20, the boot coprocessor 22 may read operating system loader 20 information and then notify the processor 4 upon reading the operating system loader 20. In this way, the processor 4 is assured that the operating system loader 4 is available to be read to load the operating system 8. The coprocessor 22 may determine the operability of other disks subject to initialization by reading information from the disks.

Figure 3:
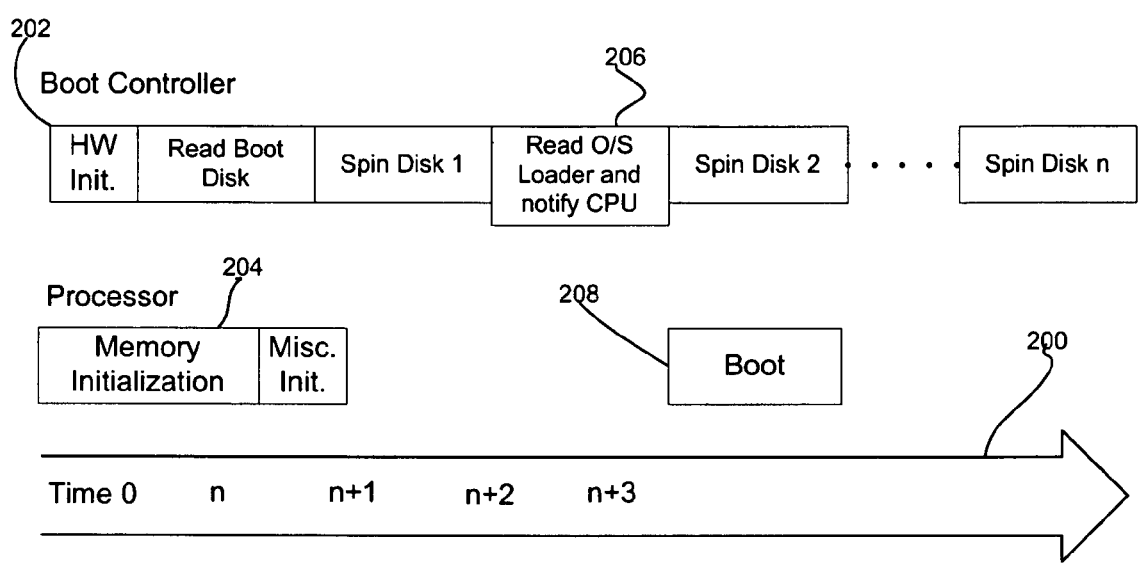
FIG. 3 illustrates an embodiment of a boot sequence timeline.

FIG. 3 illustrates an example of a boot sequence timeline 200. As shown, at time 0, both the boot coprocessor 22 and processor 4 begin initialization operations 202 and 204, respectively. After the boot coprocessor 22 spins the first disk including the operating system loader and reads the operating system at step 206, the boot coprocessor 22 notifies the processor 4. In response to receiving the notification, the processor 4 may then boot and load the operating system 8 at step 208. Even after the computer 2 boots, the boot coprocessor 22 may continue to spin-up other disks if the spin-up of all disks is not completed by the time the system boots. In an alternative embodiment, there may only be one disk to spin-up.

Described embodiments provide a technique to decrease the boot-up time by providing an additional coprocessor to concurrently perform certain initialization operations, such as spin-up the disks, while the processor performs other initialization operations. In this way, the time elapsed before the main processor begins to load the operating system into the runtime environment is reduced.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In one embodiment, the boot coprocessor 22 comprises a microcontroller that is relatively inexpensive in relation to the cost of the processor 4. In an alternative embodiment, the processor 4 may comprise multiple processors and the operations described as performed by the boot coprocessor 22 may be performed by one of the multi-processors or one core on a multi-core processor.

The illustrated operations of FIG. 2 shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method for executing a boot sequence in a computer, wherein there are a plurality of storage devices to initialize to an operable state during the boot sequence, comprising:

signaling, by a first processor, a second processor to begin initialization;

initializing, by the first processor, computer resources;

passing, by the first processor, information indicating one of the storage devices including an operating system loader;

issuing commands, by the second processor, to initialize the indicated storage device to place the indicated storage device in the operable state in response to the signaling by the first processor, wherein the commands issued by the second processor causes the initialization of the indicated storage device before other storage devices;

determining, by the first processor, that the storage device including the operating system loader is operable; and loading, by the first processor, the operating system from the storage device including the operating system loader in response to determining that the storage device including the operating system loader is operable.

2. The method of claim 1, wherein the first processor initializes computer resources at a same time the second processor is initializing the storage devices.

3. The method of claim 1, further comprising:
issuing commands, by the second processor, to initialize the storage devices other than the indicated storage device after issuing the commands to initialize the indicated storage device.

4. The method of claim 3, wherein the first processor loads the operating system from the indicated storage device while the storage devices other than the indicated storage device are being initialized.

5. The method of claim 4, further comprising:
enabling, by the first processor, user access to the computer after loading the operating system, wherein the second processor continues to initialize the storage devices after user access is enabled.

6. The method of claim 1, further comprising:
signaling, by the second processor, to the first processor in response to determining that the storage device including the operating system loader is operable, wherein the first processor determines that the storage device including the operating system loader is operable in response to receiving the signal from the second processor.

7. The method of claim 1, further comprising:
setting, by the second processor, a flag to a ready state in response to determining that the storage device including the operating system loader is operable; and
periodically reading the flag, by the first processor, wherein the first processor determines that the storage device including the operating system loader is operable in response to reading the flag is in the ready state.

8. The method of claim 1, wherein the computer resources initialized by the first processor include memory resources, further comprising:
initializing, by the second processor, a hardware interface enabling access to the storage devices in response to the signaling by the first processor, wherein the second processor issues the commands to initialize the storage devices to the operable state in response to initializing the hardware interface.

9. The method of claim 1, wherein the storage devices comprise a hard disk drives, and wherein initializing the storage devices comprise applying power to spin-up the hard disk drives.

10. A method for executing a boot sequence in a computer, comprising:
signaling, by a first processor, a second processor to begin initialization;
initializing, by the first processor, computer resources;
issuing commands, by the second processor, to initialize at least one storage device to place the at least one storage device in an operable state in response to the signaling by the first processor;
determining, by the first processor, that one storage device including an operating system loader is operable in response to the second processor reading the operating system loader in the storage device; and
loading, by the first processor, the operating system from the storage device including the operating system loader in response to determining that the storage device including the operating system loader is operable.

11. A system, comprising:
a first processor;
a second processor;
computer resources;
a plurality of storage devices, wherein one storage device includes an operating system loader;
a memory;
first code executed by the first processor to cause operations to be performed, the operations comprising:
signaling the second processor to begin initialization;
initializing the computer resources;
passing information indicating one storage device including the operating system loader;
determining that the storage device including the operating system loader is operable; and
loading the operating system from the storage device including the operating system loader to the memory in response to determining that the storage device including the operating system loader is operable; and second code executed by the second processor to cause operations to be performed, the operations comprising:
issuing commands to initialize the indicated storage device to place the indicated storage device in an operable state in response to the signaling by the first processor, wherein the commands issued by the second processor causes the initialization of the indicated storage device before the initialization of the other storage devices to the operable state.

12. The system of claim 11, wherein the first processor initializes computer resources at a same time the second processor is initializing the storage devices.

13. The system of claim 11, wherein the second code executed by the second processor further causes operations comprising:
issuing commands to initialize the storage devices other than the indicated storage device after issuing the commands to initialize the indicated storage device.

14. The system of claim 13, wherein the first processor loads the operating system from the indicated storage device while the storage devices other than the indicated storage device are being initialized.

15. The system of claim 13, wherein the first code executed by the first processor further causes operations comprising:
enabling user access to the computer after loading the operating system, wherein the second processor continues to initialize the storage devices after user access is enabled.

16. The system of claim 11, wherein the second code executed by the second processor further causes operations comprising:
signaling to the first processor in response to determining that the storage device including the operating system loader is operable, wherein the first processor determines that the storage device including the operating system loader is operable in response to receiving the signal from the second processor.

17. The system of claim 11, wherein the second code executed by the second processor further causes operations comprising:

setting a flag to a ready state in response to determining that the storage device including the operating system loader is operable; and periodically reading the flag, by the first processor, wherein the first processor determines that the storage device including the operating system loader is operable in response to reading the flag is in the ready state.

18. The system of claim 11, wherein the computer resources initialized by the first processor include memory resources, wherein the second code executed by the second processor further causes operations comprising:

initializing a hardware interface enabling access to the storage devices in response to the signaling by the first processor, wherein the second processor issues the commands to initialize the storage devices to the operable state in response to initializing the hardware interface.

19. The system of claim 11, wherein the storage devices comprise hard disk drives, and wherein initializing the storage devices comprise applying power to spin-up the disk drives.

20. A system, comprising:
a first processor;
a second processor;
computer resources;
at least one storage device, wherein one storage device includes an operating system loader;
a memory;
first code executed by the first processor to cause operations to be performed, the operations comprising:
signaling the second processor to begin initialization;
initializing the computer resources;
determining, by the first processor, that one storage device including the operating system loader is operable in response to the second processor reading the operating system loader in the storage device; and
loading the operating system from the storage device including the operating system loader to the memory in response to determining that the storage device including the operating system loader is operable; and
second code executed by the second processor to cause operations to be performed, the operations comprising:
issuing commands to initialize the at least one storage device to place the at least one storage device in an operable state in response to the signaling by the first processor.

21. An article of manufacture comprising computer readable storage media having first code and second code for executing a boot sequence in a computer, wherein there are a plurality of storage devices to initialize to an operable state during the boot sequence, wherein the first code is executed by a first processor and the second code is executed by a second processor to perform operations, the operations comprising:

signaling, by the first processor, the second processor to begin initialization;
initializing, by the first processor, computer resources;
passing, by the first processor, information indicating one storage device including the operating system loader;
issuing commands, by the second processor, to initialize the indicated storage device to place the indicated storage device in the operable state in response to the signaling by the first processor, wherein the commands issued by the second processor causes the initialization of the indicated storage device before other storage devices;

determining, by the first processor, that the storage device including the operating system loader is operable; and
loading, by the first processor, the operating system from the storage device including the operating system loader in response to determining that the storage device including the operating system loader is operable.

22. The article of manufacture of claim 21, wherein the first processor initializes computer resources at a same time the second processor is initializing the storage devices.

23. The article of manufacture of claim 21, wherein the operations further comprise:
issuing commands, by the second processor, to initialize the storage devices other than the indicated storage device after issuing the commands to initialize the indicated storage device.

24. The article of manufacture of claim 23, wherein the first processor loads the operating system from the indicated storage device while the storage devices other than the indicated storage device are being initialized.

25. The article of manufacture of claim 24, wherein the operations further comprise:
enabling, by the first processor, user access to the computer after loading the operating system, wherein the second processor continues to initialize the storage devices after user access is enabled.

26. The article of manufacture of claim 21, wherein the operations further comprise:
signaling, by the second processor, to the first processor in response to determining that the storage device including the operating system loader is operable, wherein the first processor determines that the storage device including the operating system loader is operable in response to receiving the signal from the second processor.

27. The article of manufacture of claim 21, wherein the operations further comprise:
setting, by the second processor, a flag to a ready state in response to determining that the storage device including the operating system loader is operable; and
periodically reading the flag, by the first processor, wherein the first processor determines that the storage device including the operating system loader is operable in response to reading the flag is in the ready state.

28. The article of manufacture of claim 21, wherein computer resources initialized by the first processor include memory resources, wherein the operations further comprise:
initializing, by the second processor, a hardware interface enabling access to the storage devices in response to the signaling by the first processor, wherein the second processor issues the commands to initialize the storage devices to the operable state in response to initializing the hardware interface.

29. The article of manufacture of claim 21, wherein the storage devices comprise hard disk drives, and wherein initializing the storage devices comprise applying power to spin-up the hard disk drives.

30. An article of manufacture comprising computer readable storage media having first code and second code for executing a boot sequence in a computer, wherein there are a plurality of storage devices to initialize to an operable state during the boot sequence, wherein the first code is executed by a first processor and the second code is executed by a second processor to perform operations, the operations comprising:
signaling, by the first processor, the second processor to begin initialization;

initializing, by the first processor, computer resources;

issuing commands, by the second processor, to initialize at least one storage device to place the at least one storage device in an operable state in response to the signaling by the first processor;

determining, by the first processor, that one storage device including an operating system loader is operable in response to the second processor reading the operating system loader in the storage device; and loading, by the first processor, the operating system from the storage device including the operating system loader in response to determining that the storage device including the operating system loader is operable.

31. A device in communication with a first processor for executing a boot sequence in a computer and to initialize a plurality of storage devices to an operable state during the boot sequence, wherein the first processor initializes computer resources, comprising:

a second processor;

second code executed by the second processor to cause operations to be performed, the operations comprising:

receiving a signal from the first processor to begin initialization;

receiving indication from the first processor of one storage device including the operating system loader; and issuing commands to initialize the indicated storage device to place the indicated storage device in an operable state in response to the signaling by the first processor, wherein the commands issued by the second processor causes the initialization of the indicated storage device before the initialization of the other storage devices to the operable state, and wherein the first processor loads the operating system from the storage device including the operating system loader in response to determining that the storage device including the operating system loader is operable.

32. The system of claim 31, wherein the operations caused by the executed second code further comprise:

reading the operating system loader in the storage device, wherein the first processor determines that the storage device including the operating system loader is operable in response to the second processor reading the operating system loader in the storage device.

* * * * *

UNITED STATES PATENT AND TRADEMARK OFFICE
CERTIFICATE OF CORRECTION

PATENT NO. : 7,281,127 B2  Page 1 of 1
APPLICATION NO. : 11/024262
DATED : October 9, 2007
INVENTOR(S) : Michael A. Rothman and Vincent J. Zimmer It is certified that error appears in the above-identified patent and that said Letters Patent is hereby corrected as shown below:

Col. 5, line 50, change "comprise a hard disk drives" to "comprise hard disk drives".

Signed and Sealed this

Seventeenth Day of November, 2009

David J. Kappos
*Director of the United States Patent and Trademark Office*